US012808895B2

(12) United States Patent
Kelly et al.

(10) Patent No.: US 12,808,895 B2
(45) Date of Patent: *Nov. 24, 2026

(54) DEVICE AND SYSTEM FOR ULTRASONIC TRANSMISSION OF ACCELEROMETER DATA

(71) Applicants: James Kelly, Denver, CO (US); Patrick LaFontaine, Dover, DE (US)

(72) Inventors: James Kelly, Denver, CO (US); Patrick LaFontaine, Dover, DE (US)

( * ) Notice: Subject to any disclaimer, the term of this patent is extended or adjusted under 35 U.S.C. 154(b) by 280 days.

This patent is subject to a terminal disclaimer.

(21) Appl. No.: 18/622,348

(22) Filed: Mar. 29, 2024

(65) Prior Publication Data

US 2024/0241149 A1 Jul. 18, 2024

Related U.S. Application Data

(63) Continuation-in-part of application No. 17/751,807, filed on May 24, 2022, now Pat. No. 11,948,442, which is a continuation-in-part of application No. 17/155,563, filed on Jan. 22, 2021, now Pat. No. 11,341,831.

(60) Provisional application No. 62/964,317, filed on Jan. 22, 2020.

(51) Int. Cl.
*G01P 1/00* (2006.01)
*G01P 1/02* (2006.01)
*H04B 11/00* (2006.01)

(52) U.S. Cl.
CPC .............. *G01P 1/023* (2013.01); *H04B 11/00* (2013.01)

(58) Field of Classification Search
CPC ................................ G01P 1/023; H04B 11/00
See application file for complete search history.

(56) References Cited

U.S. PATENT DOCUMENTS

| | | | | |
|---|---|---|---|---|
| 2005/0177929 A1* | 8/2005 | Greenwald | A61B 5/11 | 73/865.9 |
| 2006/0038694 A1* | 2/2006 | Naunheim | A42B 3/046 | 73/514.24 |
| 2006/0189852 A1* | 8/2006 | Greenwald | A61B 5/6803 | 600/595 |
| 2011/0181418 A1* | 7/2011 | Mack | A42B 3/046 | 340/573.1 |
| 2015/0040665 A1* | 2/2015 | Borkholder | A63B 24/00 | 73/510 |
| 2018/0133583 A1* | 5/2018 | Tran | G06F 3/00 | |

FOREIGN PATENT DOCUMENTS

| | | | |
|---|---|---|---|
| WO | WO-2015047216 A1 * | 4/2015 | H04W 4/16 |

* cited by examiner

*Primary Examiner* — Francis C Gray
(74) *Attorney, Agent, or Firm* — Shore IP Group, PLLC; Sean R. Wilsusen

(57) ABSTRACT

A system for detecting impacts includes a housing configured to be worn by a user. An accelerometer is connected with the housing. The accelerometer is configured to detect an acceleration indicative of an impact experienced by the user. An inaudible tone chip is positioned about the housing. The inaudible tone chip is configured to transmit ultrasonic tones including data of the impact to a remote device. A remote device includes a receiver. The receiver is configured to receive the ultrasonic tones transmitted by the inaudible tone chip.

16 Claims, 8 Drawing Sheets

DEVICE AND SYSTEM FOR ULTRASONIC TRANSMISSION OF ACCELEROMETER DATA

The present application is a continuation-in-part of U.S. patent application Ser. No. 17/751,807, filed May 24, 2022 and issuing as U.S. Pat. No. 11,948,442 on Apr. 2, 2024, which is a continuation-in-part of U.S. patent application Ser. No. 17/155,563, filed on Jan. 22, 2021 and issued as U.S. Pat. No. 11,341,831 on May 24, 2022, which claims the benefit of and priority to U.S. Provisional Patent Application No. 62/964,317, filed on Jan. 22, 2020. The entire disclosure of the foregoing application is incorporated by reference herein.

BACKGROUND

Technical Field

This disclosure relates to devices and systems for ultrasonic transmission of accelerometer data and, mor particularly, to ultrasonic transmission of accelerometer data related to impacts.

Discussion of Related Art

Concussions, also referred to as mild traumatic brain injury (mTBI), are generally defined as head injuries that at least temporarily affect brain functioning. Symptoms may include loss of consciousness (LOC); loss of memory; headaches; cognitive impairment; loss of concentration or balance; nausea; blurred vision; sleep disturbances; and mood changes. These symptoms may begin immediately or appear days after the injury. It is common for symptoms to last at least 2 weeks in adults and at least 4 weeks in children.

Fewer than 10% of sports-related concussions are associated with a loss of consciousness, and many such concussions do not result in any medical treatment. It is generally understood that a large majority of concussions, particularly mild concussions or concussions with little or no obvious symptoms, go undetected.

SUMMARY

In accordance with an aspect of the disclosure, a system for detecting impacts includes a housing (e.g., a helmet) configured to be worn by a user. An accelerometer is connected with the housing. The accelerometer is configured to detect an acceleration indicative of an impact experienced by the user. An inaudible tone chip is positioned about the housing. The inaudible tone chip is configured to transmit ultrasonic tones including data of the impact to a remote device. A remote device includes a receiver. The receiver is configured to receive the ultrasonic tones transmitted by the inaudible tone chip.

In some respects, the housing is a helmet worn by the user.

In some aspects, the housing is protective sports equipment worn by the user. The sports equipment may include a plurality of accelerometers each connected with one or more inaudible tone chips configured to transmit ultrasonic tones including data of impacts or accelerations occurring at a plurality of positions about the protective sports equipment.

In some aspects, the remote device is a Smartphone or Tablet Computer, and the receiver is a microphone of the remote device.

In some aspects, a rechargeable battery is positioned about the housing. The rechargeable battery is connected with the accelerometer and the inaudible tone chip to provide power thereto.

In some aspects, the housing is a helmet including an adjustment knob. The adjustment knob is configured to adjust a size of the helmet by rotating the knob to achieve a tighter or looser fit about a user's head. The accelerometer is embedded in the adjustment knob.

In some aspects, the adjustment knob includes at least two electrode prongs extended from the adjustment knob. The at least two electrode prongs are configured to directly contact the user's head.

In some aspects, the housing includes a computer having a processor and a memory. The computer is configured to control the inaudible tone chip. The computer is configured to convert the data of the impact into a plurality of data packets and transmit each data packet of the plurality of data packets at a different inaudible frequency to the mobile device.

In some aspects, the housing includes a wireless antenna. The wireless antenna is configured to transmit or receive data via a WiFi, Bluetooth or cellular network connection.

In some aspects, the data of the impact is transmitted to a relay. The relay transmits the data of the impact to the remote device.

In some aspects, the relay is a server, such as a cloud-based server configured to receive the data and retransmit the data to the remote device.

In accordance with an aspect of the disclosure, a system for detecting impacts includes a number of housings are configured to be worn by a user. A number of accelerometers are connected with a corresponding housing. Each accelerometer is configured to detect an acceleration indicative of an impact experienced by the user. A number of inaudible tone chips are connected with the accelerometers. Each inaudible tone chip is configured to transmit ultrasonic tones including data of the impact to a remote device. A remote device includes a receiver configured to receive the ultrasonic tones transmitted by the inaudible tone chips.

In some aspects, at least one first housing is a helmet configured to be worn by the user and at least one second housing is a mouthguard configured to be worn by the user.

In some aspects, at least one third housing is an item of protective padding configured to be worn by the user.

In some aspects, the accelerometers are interconnected with each other to form an array of accelerometers.

In some aspects, an integration module is connected with the array of accelerometers. The integration module is configured to receive data from each accelerometer and generate a data packet including data of the impact for transmission to the remote device.

In some aspects, the integration module includes at least one processor and at least one memory in communication with the at least one processor.

In some aspects, the integration module includes at least one wireless antenna configured to communicate with the remote device.

In some aspects, the integration module further includes a machine learning module configured to analyze the data of the impact.

In some aspects, the integration module is connected with at least one item of protective equipment worn by the user.

BRIEF DESCRIPTION OF THE DRAWINGS

The accompanying drawings, which are incorporated in and constitute a part of this specification, illustrate aspects and features of the disclosure and, together with the detailed description below, serve to further explain the disclosure, in which.

DETAILED DESCRIPTION

Figure 1:
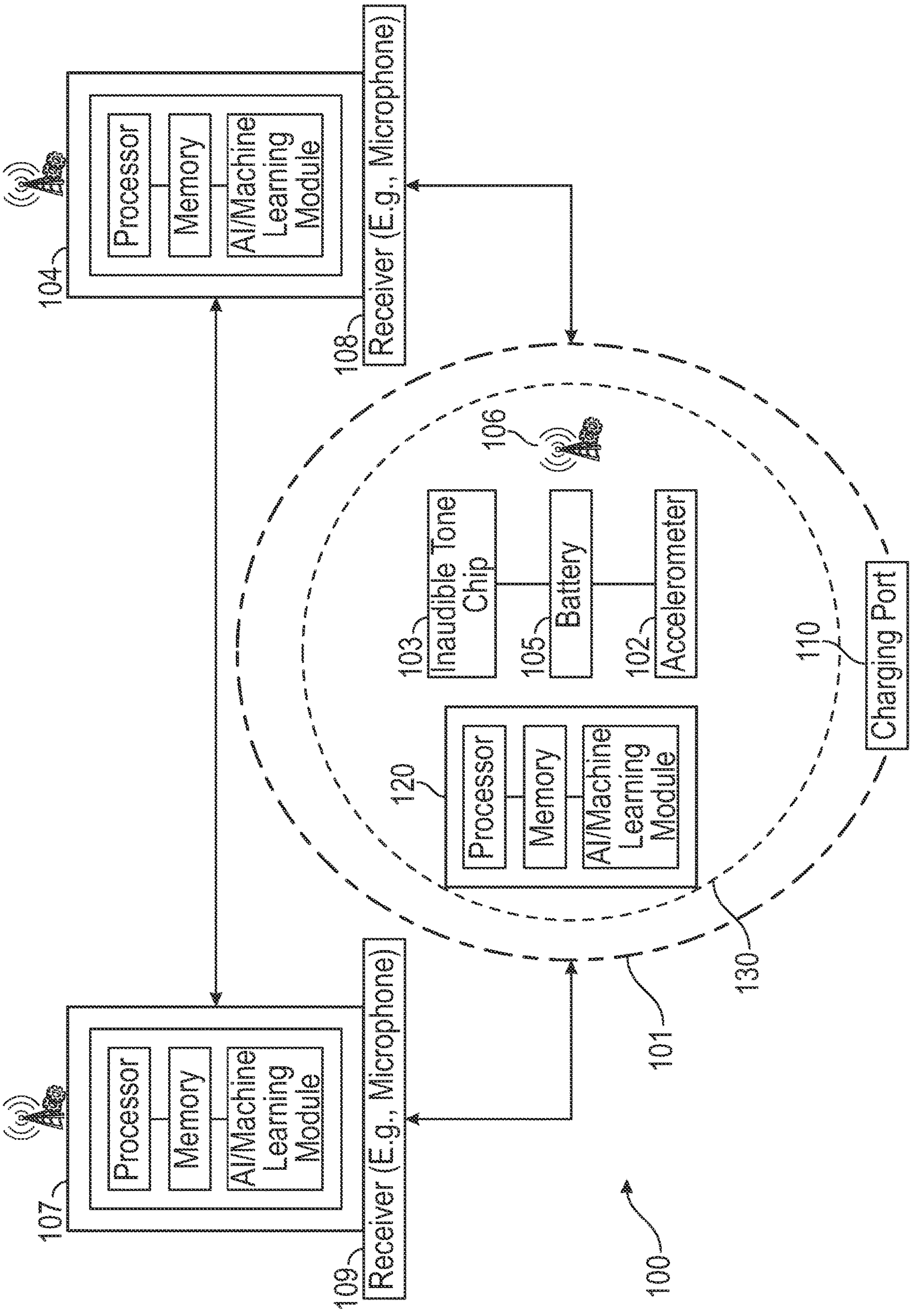
FIG. 1 illustrates a device and system for detecting impacts and transmitting data of such impacts via inaudible tones in accordance with the present disclosure.

As used herein, the terms parallel and perpendicular are understood to include relative configurations that are substantially parallel and substantially perpendicular up to about + or −10 degrees from true parallel and true perpendicular.

"About" or "approximately" or "substantially" as used herein may be inclusive of the stated value and means within an acceptable range of variation for the particular value as determined by one of ordinary skill in the art, considering tolerances (e.g., material, manufacturing, use, environmental, etc.) as well as the measurement in question and the error associated with measurement of the particular quantity (e.g., the limitations of the measurement system). For example, "about:" may mean within one or more standard variations, or within 30%, 20%, 10%, 5% of the stated value.

Descriptions of technical features or aspects of an exemplary embodiment of the disclosure should typically be considered as available and applicable to other similar features or aspects in another exemplary embodiment of the disclosure. Accordingly, technical features described herein according to one exemplary embodiment of the disclosure may be applicable to other exemplary embodiments of the disclosure, and thus duplicative descriptions may be omitted herein.

Exemplary embodiments of the disclosure will be described more fully below (e.g., with reference to the accompanying drawings). Like reference numerals may refer to like elements throughout the specification and drawings.

An example of an inaudible tone chip, as described herein, is further described in U.S. Pat. No. 10,497,196, issued on Dec. 3, 2019; and U.S. Pat. No. 10,242,518, issued on Mar. 26, 2019, the disclosures of which are incorporated by reference herein in their entireties.

Referring to FIG. 1, a system 100 for detecting impacts includes a housing 101 (e.g., a helmet, such as a sports helmet) configured to be worn by a user. An accelerometer 102 is connected with the housing 100. The accelerometer 102 is configured to detect an acceleration indicative of an impact experienced by the user. An inaudible tone chip 103 is positioned about the housing 101. The inaudible tone chip 103 is configured to transmit ultrasonic tones including data of the impact to a remote device 104. The remote device 104 includes a receiver 108 (e.g., a microphone). The receiver 108 is configured to receive the ultrasonic tones transmitted by the inaudible tone chip 103.

According to an exemplary embodiment, the accelerometer 102 may be an accelerometer configured for contact with a user's skin, or a mouthguard including an accelerometer therein.

The accelerometer 102 may be included in a housing configured to be coupled to a user's teeth (e.g., a user's molars), which may be employed for a user who is unable to wear a traditional mouthguard.

The accelerometer may be included in a headband, such as an elastic headband worn around a user's head. The headband may be employed to maintain contact between the accelerometer 102 and the user's head. Alternatively, the accelerometer 102 may be arranged in a tight fitting cap, such as a swimmers style cap, which may be employed to maintain contact between the accelerometer 102 and the user's head. The headband of swimmers style cap may each include a moisture wicking and/or microbial material. The headband or swimmers style cap can be employed for a sport or activity that does not include a helmet worn by a user.

In some aspects, the housing 101 is a helmet worn by the user. As an example, the helmet may be a helmet worn for automotive racing. Alternatively, the housing 101 may be protective sports equipment worn by the user. The sports equipment may include a plurality of accelerometers (e.g., a plurality of accelerometers that are substantially the same as accelerometer 102) each connected with one or more inaudible tone chips configured to transmit ultrasonic tones including data of impacts or accelerations occurring at a plurality of positions about the protective sports equipment. The plurality of accelerometers may detect multiple impacts, accelerations or collisions occurring at various types of sporting equipment (e.g., shin guards, shoulder pads, gloves, jockstraps, mouth guards, neck pads, footwear, elbow pads, arm or wrist guards, chest protectors, knee pads, face masks, thigh pads, ice skates, and the like). Accelerometers may be positioned anywhere within a user's padding, such as below an outer surface or shell of any type of sports equipment.

The housing 101 described herein may also be safety equipment, such as safety helmets, external protective gear or other padding. The housing 101 may be a performance suite (e.g., a ski suit), or a safety suit worn in a military application.

The plurality of accelerometers may be networked together and ultrasonic tones may be transmitted from each of the plurality of accelerometers by a single inaudible tone chip, or each accelerometer to employ its own inaudible tone chip.

In some aspects, a rechargeable battery 105 is positioned about the housing 101. The rechargeable battery 105 is connected with the accelerometer 102 and with inaudible tone chip 103 to provide power thereto. The housing 101 may include a charging port, 110 such as a USB charging port configured to charge the rechargeable battery 105. The USB charging port may also be utilized as a data transmission port for communication with the inaudible tone chip 103 and/or with the computer 120 positioned about the housing 101.

The inaudible tone chip 103 may include or may communicate with a memory to store impact data thereon for later transfer (e.g., vie the USB charging port in which data is transferred via a wired connection).

Figure 2:
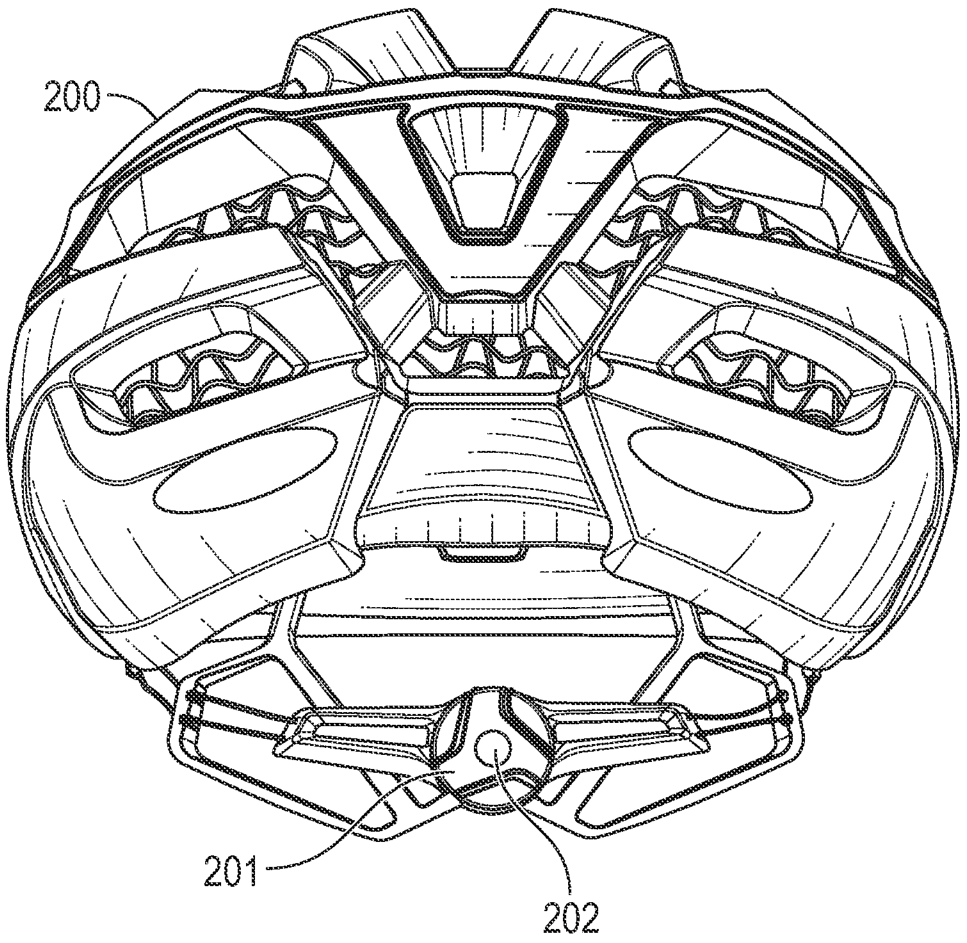
FIG. 2 is a rear view of an exemplary helmet and adjustment knob in accordance with the present disclosure.
Figure 3A:
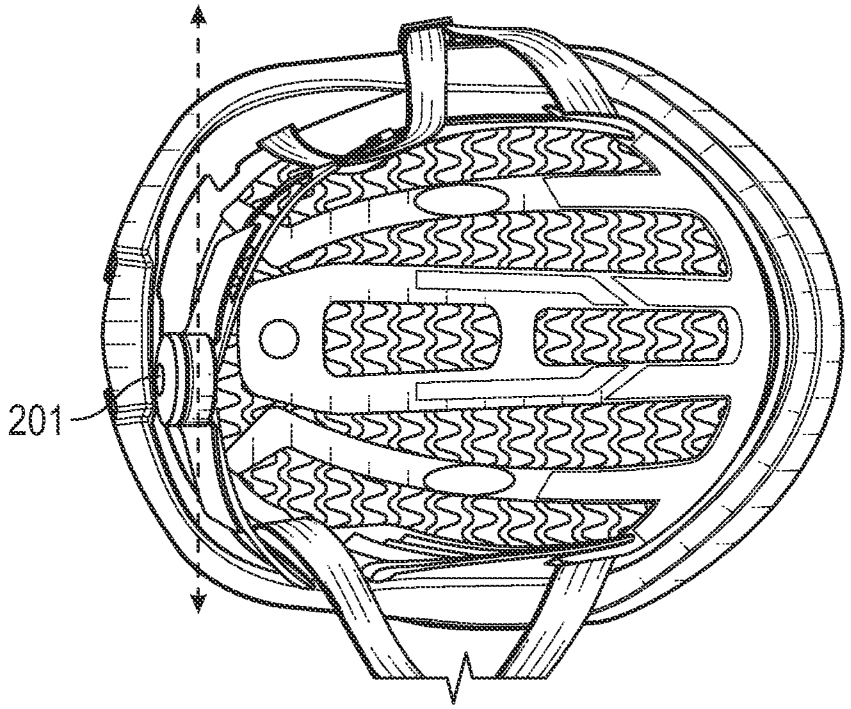
FIG. 3A is a bottom view of the helmet of FIG. 2.
Figure 3B:
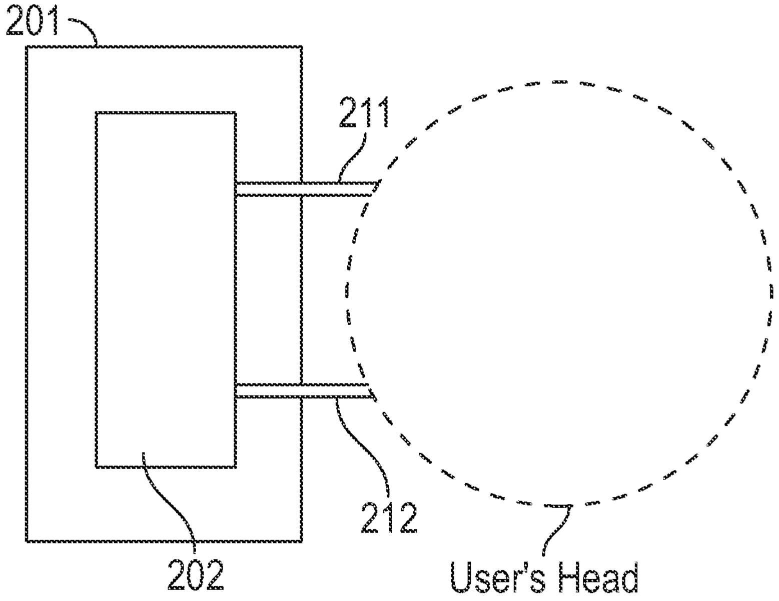
FIG. 3B is a cross-sectional view of the adjustment knob of FIG. 3A with an embedded accelerometer therein having exposed prongs.

In some aspects, the housing 101 is a helmet (e.g., helmet 200 of FIGS. 2 and 3) including an adjustment knob 201. An accelerometer 202 may be embedded in the adjustment knob 201. For example, the adjustment knob 201 may include at least two electrode prongs 211, 212, extended from the adjustment knob 201. The at least two electrode prongs 211, 212 are configured to directly contact the user's head. The adjustment knobs 211, 212 may be used to securely attach a helmet to a user's head, and thus employing the adjustment knob 201 as a location for the accelerometer 202 maximizes consistent contact between the electrode prongs 211, 212 of the accelerometer 202 and the user's head (e.g., with the user's skin).

The electrode prongs 211, 212 may indicate contact with a user's skin to signal that an accelerometer 202 is associated with a housing in actual, current use. The contact with the user's skin may also provide data about proper or improper positioning of the accelerometer 202. A signal may be generated and transmitted to the mobile device 104 to capture data upon the electrode prongs 211, 212 contacting a user's skin.

As an example, an impact detecting apparatus 130 (e.g., including accelerometer 102, battery 105, inaudible tone chip 103, computer 120 and/or wireless antenna 106) may be self-contained device positioned in housing 101 or in any other sports equipment or other housing described herein. While the impact detecting apparatus 130 may be automatically active, as described herein, it may also be manually activated.

As an example, capturing data only when the impact detecting apparatus associated with a housing 101 in actually used allows battery life to be maximized for the impact detecting apparatus, thus limiting a frequency with which the battery is charged.

In some aspects, the remote device 104 is a Smartphone or Tablet Computer. As an example, the Smartphone is positioned within a sports arena in general proximity to the housing. A receiver 108, such as a microphone of the Smartphone, may receive the ultrasonic tones transmitted by the inaudible tone chip 103, and thus data of an impact recorded or detected by the accelerometer 102 may be transmitted to the Smartphone for further processing. As an example, a sports coach may receive data of an impact experienced by a player wearing a helmet, as described herein. The Smartphone may include software thereon configured to issue an alert to the coach regarding an impact above a predetermined threshold indicative of a concussion having been experienced by the user of the impact detecting apparatus described herein.

Any of the housing 101, relay 107, or mobile device 104 described herein may include the general-purpose computer described herein.

As an example, the housing 101 includes a computer 120 having a processor and a memory. The computer is configured to control the inaudible tone chip 103. The computer 120 is configured to convert the data of the impact into a plurality of data packets and transmit each data packet of the plurality of data packets at a different inaudible frequency.

In some aspects, the housing includes a wireless antenna 106. The wireless antenna 106 is configured to transmit or receive data via a WiFi, Bluetooth or cellular network connection. The relay 107 and/or the mobile device 104 may also include a similar wireless antenna.

According to an exemplary embodiment, the data of the impact is transmitted to the relay 107 (e.g., is received by a receiver 109, such as a microphone, of the relay 107). The relay 107 transmits the data of the impact to the remote device 104. The relay 107 may be particularly useful if data cannot be transmitted directly from the impact detecting apparatus 130 to the mobile device 104. The relay 107 may be a server, such as a cloud-based server configured to receive the data and retransmit the data to the remote device 104. The relay 107 may receive data via inaudible tones but may transmit data vie the wireless antenna. Alternatively, the relay 107 may receive data via wireless antenna, but may transmit data via inaudible tones.

A determination of how data is transmitted may be made onboard the housing 101 by the computer 120. For example, data may be transmitted directly from the inaudible tone chip 103 positioned about the housing 101 to the mobile device 104 substantially in real-time (e.g., at a single ultrasonic frequency or multiple ultrasonic frequencies). Alternatively, if a Bluetooth connection with a relay 107 is available, data may be initially transmitted via the Bluetooth connection. Minimizing an amount of time from an impact until data is received at the mobile device 104 minimizes an amount of time before an occurrence of an impact is detected. For example, an impact having an acceleration above a predetermined threshold indicative of a possible concussion may be detected nearly instantaneously, and thus medical treatment or ceasing physical activity to avoid a subsequent impact may be carried out nearly immediately.

In some aspects, the inaudible tone chip 103 may be connected with the battery 105 and/or the accelerometer 102 via a wired connection. A plurality of accelerometers may be positioned about the housing and may each be connected with the inaudible tone chip 103.

Figure 4:
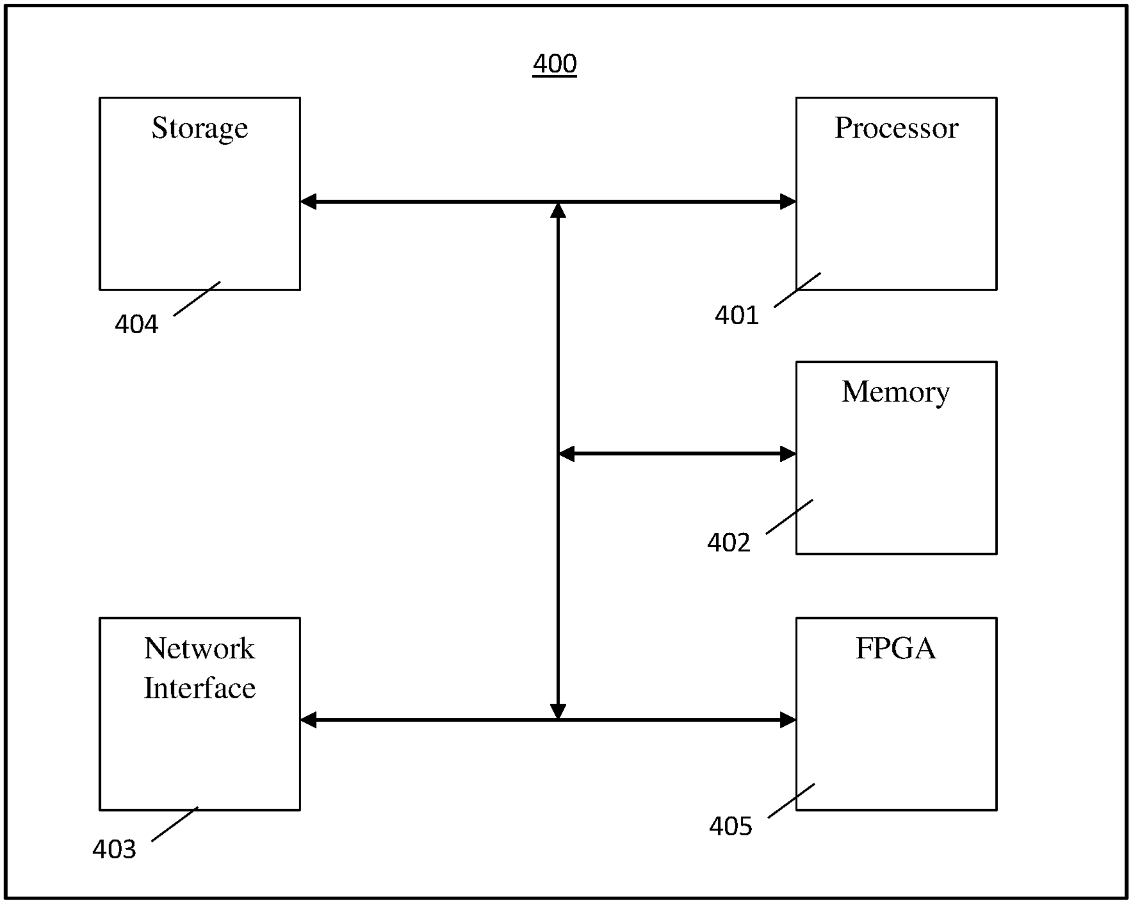
FIG. 4 is a block diagram of an exemplary computer in accordance with the present disclosure.

FIG. 4 is a block diagram of an exemplary generally purpose computer 400 which may be employed by any of the housing 101 (e.g., helmet), relay 107 or mobile device 104 (e.g., tablet or smartphone) described herein. The computer 400 may include a processor 401 connected to a computer-readable storage medium or a memory 402 which may be a volatile type memory, e.g., RAM, or a non-volatile type memory, e.g., flash media, disk media, etc. The processor 401 may be another type of processor such as, without limitation, a digital signal processor, a microprocessor, an ASIC, a graphics processing unit (GPU), field-programmable gate array (FPGA), or a central processing unit (CPU).

The memory 402 can be random access memory, read-only memory, magnetic disk memory, solid state memory, optical disc memory, and/or another type of memory. The memory 402 can communicate with the processor 401 through communication buses of a circuit board and/or through communication cables such as serial ATA cables or other types of cables. The memory 402 includes computer-readable instructions that are executable by the processor 401 to operate the computer 400 to transmit data via inaudible tones as described herein. The computer 400 may include a network interface 403 to communicate with other computers or a server. A storage device 404 may be used for storing data. The computer 400 may include an AI or machine learning module including one or more FPGAs 405. The FPGAs 405 may be used for executing various machine learning algorithms such as those described herein (e.g., an algorithm for creating data packets and transmitting said data packets via inaudible tones at various ultrasonic frequencies in-parallel with each other).

The storage device 404 stores one or more machine learning algorithms and/or models, configured to transmit data via inaudible tones via a single frequency, or to break data into a plurality of data packets and simultaneously transmit said data via different inaudible tone frequencies in-parallel. The machine learning algorithm may apply mathematical models to transmit data via inaudible tones via a single frequency, or to break data into a plurality of data packets and simultaneously transmit said data via different inaudible tone frequencies in-parallel. The machine learning algorithm(s) may be trained on and learn from experimental data and/or data from previous procedures initially input into the one or more machine learning applications in order to enable the machine learning application(s) to transmit data via inaudible tones via a single frequency, or to break data into a plurality of data packets and simultaneously transmit said data via different inaudible tone frequencies in-parallel.

Machine learning algorithms are advantageous for use in transmit data via inaudible tones via a single frequency, or to break data into a plurality of data packets and simultaneously transmit said data via different inaudible tone frequencies in-parallel, at least in that complex sensor components and pre-defined categorization rules and/or algorithms are not required. Rather, machine learning algorithms utilize initial input data to determine statistical features and/or correlations by analyzing data therefrom. Thus, with the one or more machine learning algorithms having been trained as detailed above, such can be used to transmit data via inaudible tones via a single frequency, or to break data into a plurality of data packets and simultaneously transmit said data via different inaudible tone frequencies in-parallel.

Unless otherwise indicated below, the accelerometers 102 and impact detecting apparatuses 130 described below with reference to FIGS. 5 to 8 are substantially the same as the accelerometers 102 and impact detecting apparatuses 130 described above, and thus duplicative descriptions may be omitted below.

Figure 5:
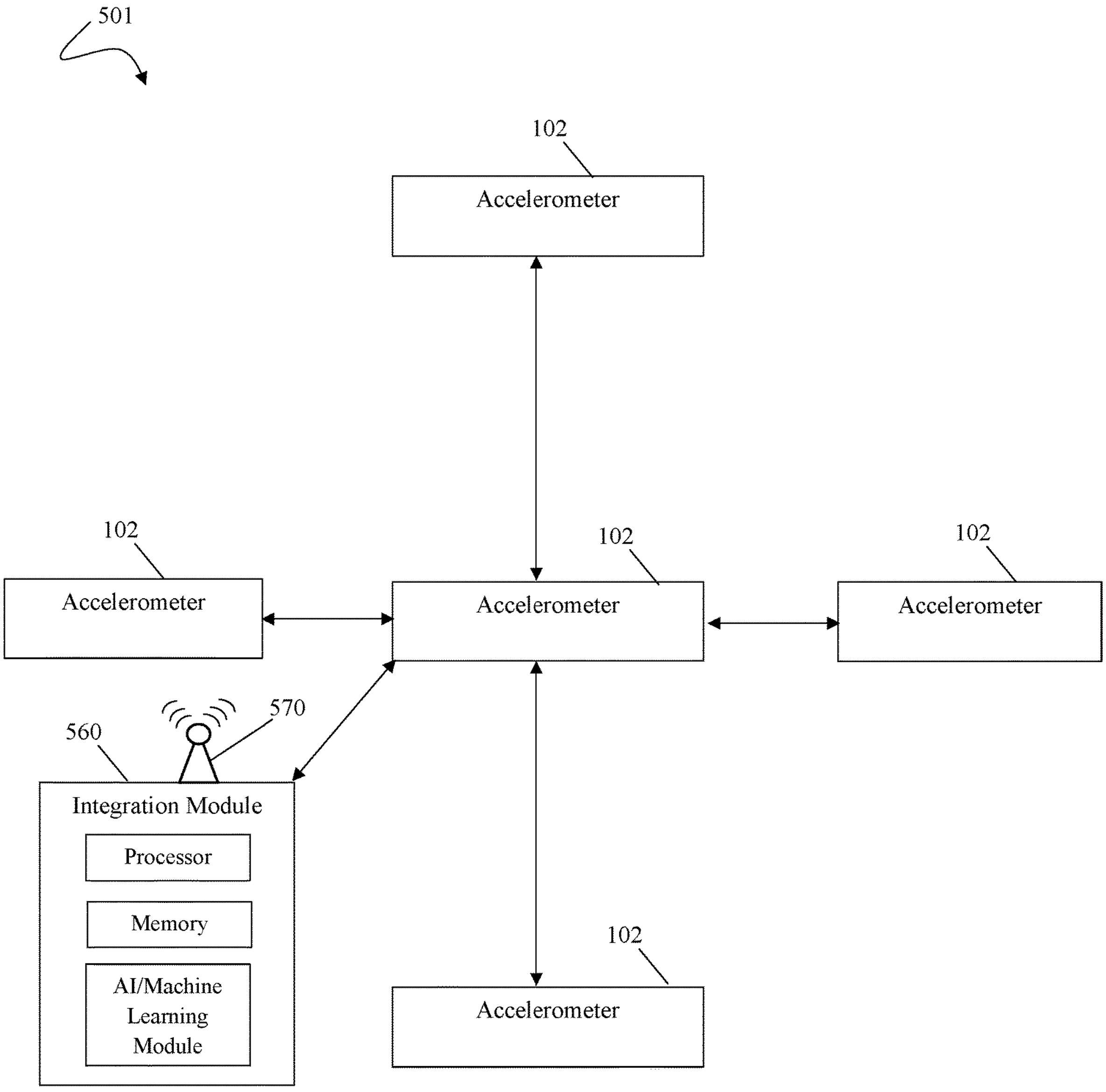
FIG. 5 illustrates an exemplary array of accelerometers in accordance with the present disclosure.

FIG. 5 illustrates an exemplary array of accelerometers 501 in accordance with the present disclosure.

Referring particularly to FIG. 5, each of the accelerometers 102 is interconnected with each other to form the array of accelerometers 501. The connections between the accelerometers may be formed with a wired or wireless connection. For example, the accelerometers each include inaudible tone chips that are in wireless communication with each other. Thus, in use, the array of accelerometers may be employed to more accurately detect impacts to various regions of a user's body.

As an example, the inaudible tone chips may each include a microcontroller unit (MCU) equipped with digital-to-analog conversion (DAC) capabilities for waveform generation. Through precise control of frequency and amplitude parameters, the MCU can produce sinusoidal waveforms in the ultrasonic or infrasonic frequency spectrum, imperceptible to human auditory faculties.

Integrated within the chip are modulation and demodulation circuits employing encoding techniques such as frequency shift keying (FSK) or phase shift keying (PSK). These modulation schemes embed digital data into the inaudible tones for transmission, ensuring data security through covert communication channels.

Additionally, each inaudible tone chip may incorporate adaptive signal processing algorithms to enhance communication reliability in adverse conditions. These algorithms dynamically adjust signal parameters to compensate for environmental noise and interference, thereby optimizing signal integrity and reception quality.

The array of accelerometers 501 may be connected with an integration module 560. The integration module may include a wireless antenna configured to receive wireless communication signals, such as signals transmitted via inaudible tones.

The integration module 560 is configured to facilitate the aggregation, transformation, and consolidation of heterogeneous data from multiple sources (e.g., different accelerometers arranged about various parts of a user's body) into a unified format. For example, the accelerometer data from various accelerometers may be incorporated into a single data packet for transmission to the remote device described herein.

Unless otherwise indicated below, the accelerometer arrays 601, 701, and 801 may be substantially the same as accelerometer array 501, and thus duplicative descriptions may be omitted below.

Figure 6:
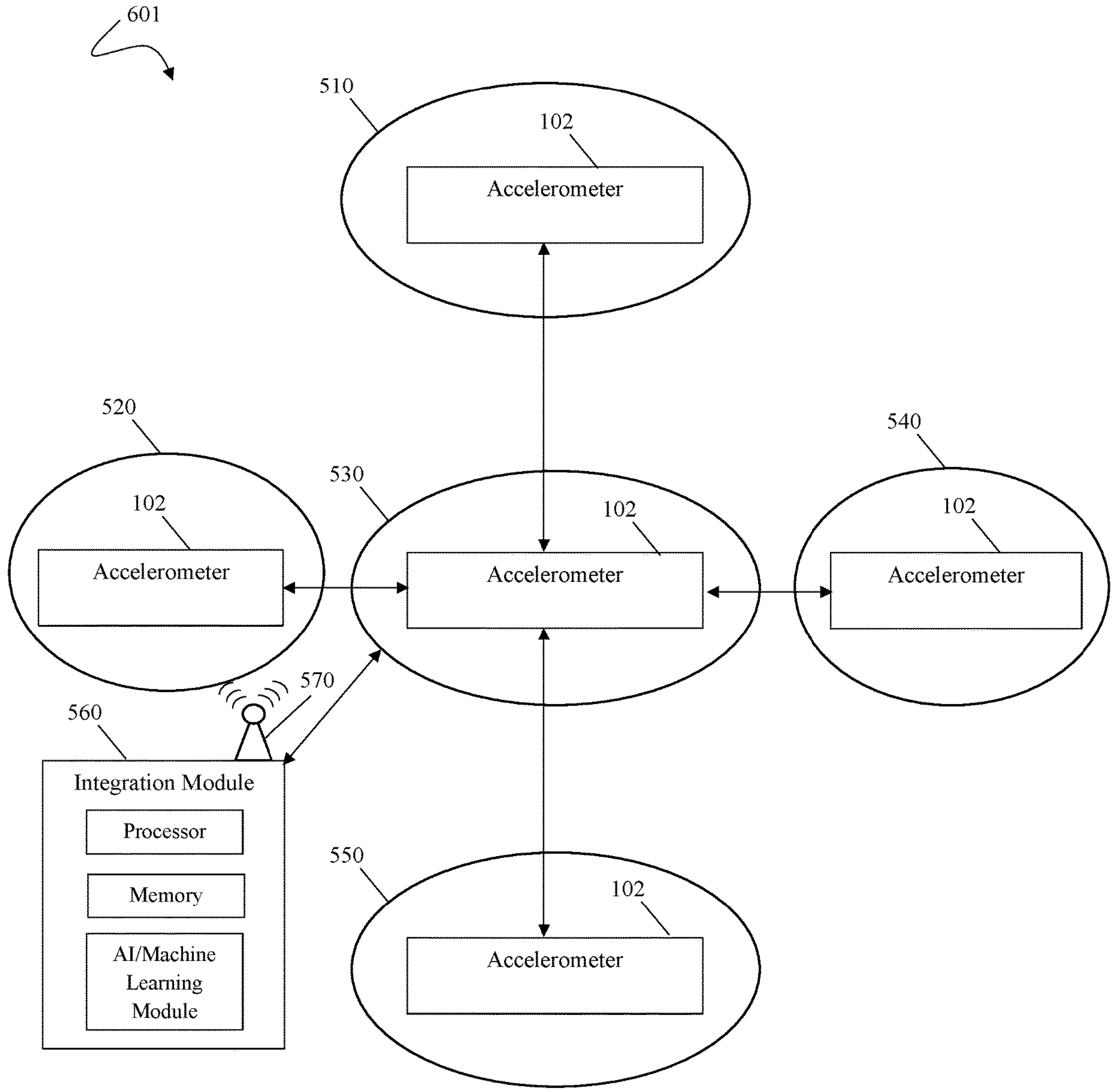
FIG. 6 illustrates an exemplary array of accelerometers incorporated into various housings in accordance with the present disclosure.

FIG. 6 illustrates an exemplary array of accelerometers 601 incorporated into various housings (e.g., housings 510, 520, 530, 540, and/or 550) in accordance with the present disclosure.

Referring particularly to FIG. 6, at least one first housing is a helmet configured to be worn by the user and at least one second housing is a mouthguard configured to be worn by the user.

In some aspects, at least one third housing is an item of protective padding configured to be worn by the user. For example, the protective padding may be any of a helmet, shoulder pads, elbow pads, gloves, shin guards, hockey pants or shorts, pelvic protectors, neck guards, mouth guards, or a jersey.

Figure 7:
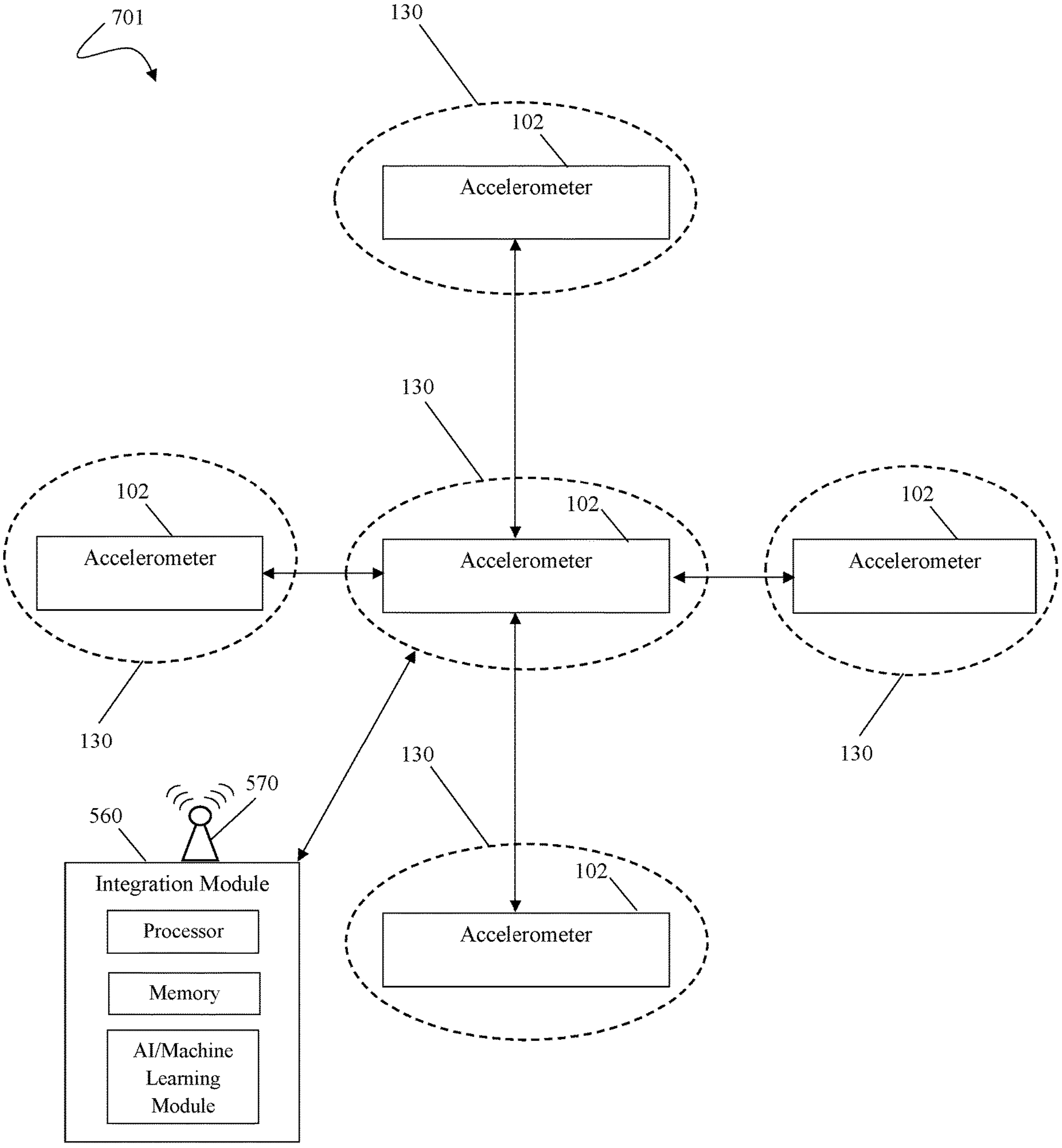
FIG. 7 illustrates an exemplary array of accelerometers including an impact detecting apparatus including an inaudible tone chip in accordance with the present disclosure.

FIG. 7 illustrates an exemplary array of accelerometers 701 each including an impact detecting apparatus 130 including an inaudible tone chip (see, e.g., inaudible tone chip 103 described in more detail above) in accordance with the present disclosure.

The array of accelerometers 701 may be connected with the integration module 560 including wireless antenna 570.

Figure 8:
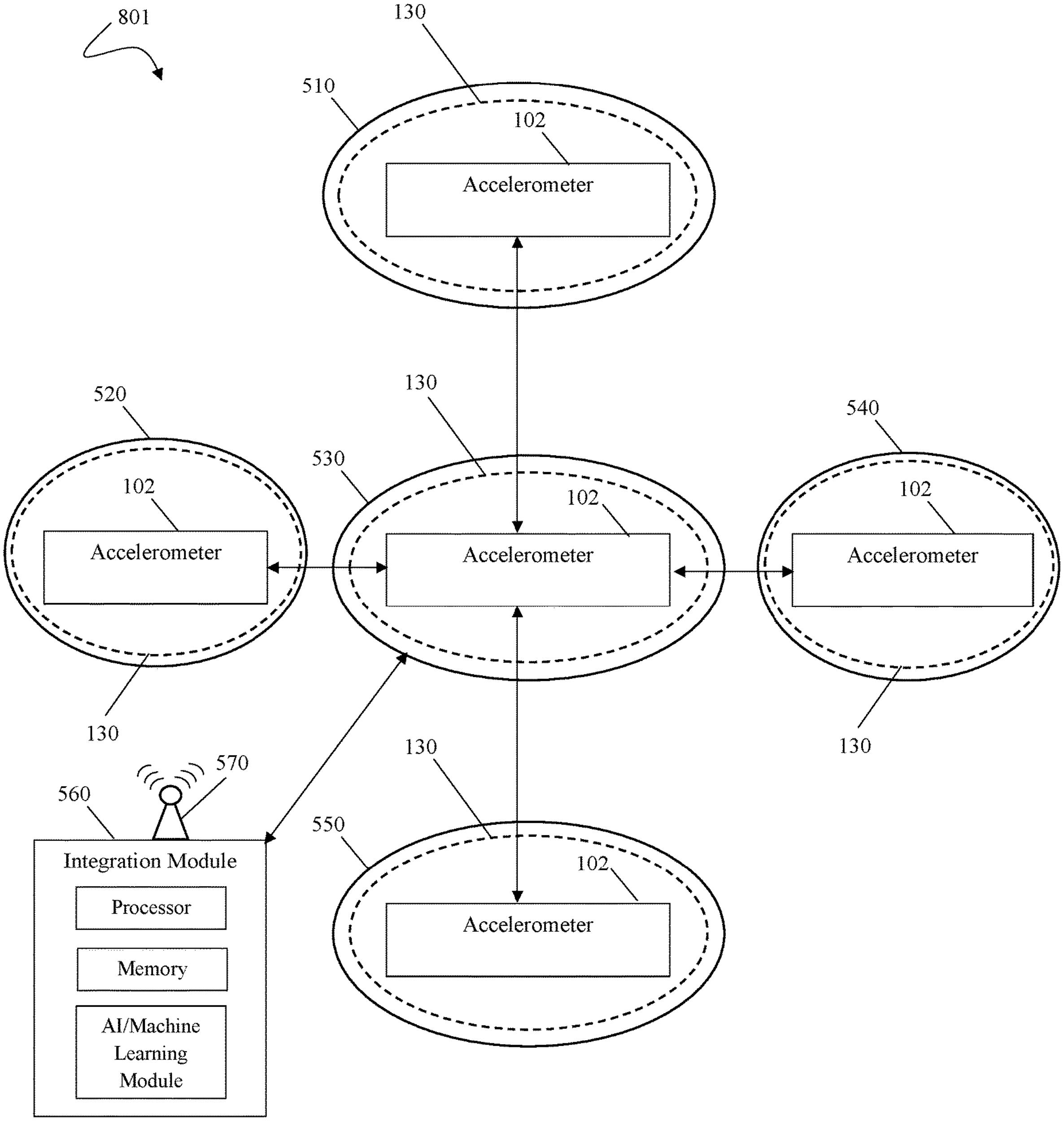
FIG. 8 illustrates an exemplary array of accelerometers incorporated into various housings and including an impact detecting apparatus including an inaudible tone chip in accordance with the present disclosure.

FIG. 8 illustrates an exemplary array of accelerometers 801 incorporated into various housings (e.g., housings 510, 520, 530, 540, and/or 550) and each including an impact detecting apparatus 130 including an inaudible tone chip (see, e.g., inaudible tone chip 103 described in more detail above) in accordance with the present disclosure.

Referring particularly to FIG. 8, a system for detecting impacts includes a number of housings (e.g., housings 510, 520, 530, 540, and/or 550) configured to be worn by a user. A number of accelerometers 102 are connected with a corresponding housing. Each accelerometer 102 is configured to detect an acceleration indicative of an impact experienced by the user. A number of inaudible tone chips (see, e.g., inaudible tone chips 103) are connected with the accelerometers 102. Each inaudible tone chip is configured to transmit ultrasonic tones including data of the impact to a remote device. A remote device (see, e.g., remote device 104) includes a receiver configured to receive the ultrasonic tones transmitted by the inaudible tone chips. As an example, the remote device may be in communication (via wired or wireless connection) with the integration module 560.

In some aspects, the integration module 560 includes at least one processor and at least one memory in communication with the at least one processor.

The integration module may include at least one wireless antenna 570 configured to communicate with the remote device.

In some aspects, the integration module 560 further includes a machine learning module configured to analyze the data of the impact.

The integration module may be connected with at least one item of protective equipment or padding worn by the user.

From the foregoing and with reference to the various figure drawings, those skilled in the art will appreciate that certain modifications can also be made to the disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for detecting impacts, comprising:

a plurality of housings configured to be worn by a user;

a plurality of accelerometers, wherein each accelerometer of the plurality of accelerometers is connected with a corresponding housing of the plurality of housings, wherein each accelerometer of the plurality of accelerometers is configured to detect an acceleration indicative of an impact experienced by the user;

a plurality of inaudible tone chips connected with the accelerometers of the plurality of accelerometers, wherein each inaudible tone chip of the plurality of inaudible tone chips is configured to transmit ultrasonic tones including data of the impact to a remote device; and a remote device including a receiver, the receiver configured to receive the ultrasonic tones transmitted by the inaudible tone chips of the plurality of inaudible tone chips.

2. The system of claim 1, wherein at least one first housing of the plurality of housings is a helmet configured to be worn by the user, and wherein at least one second housing of the plurality of housings is a mouthguard configured to be worn by the user.

3. The system of claim 2, wherein at least one third housing of the plurality of housings is an item of protective padding configured to be worn by the user.

4. The system of claim 2, wherein the helmet includes an adjustment knob, and wherein at least one accelerometer of the plurality of accelerometers is embedded in the adjustment knob.

5. The system of claim 4, wherein the adjust knob includes at least two electrode prongs extended from the adjustment knob, the at least two electrode prongs configured to directly contact the user's head.

6. The system of claim 1, wherein at least one housing of the plurality of housings includes a computer having a processor and a memory, the computer configured to control at least one inaudible tone chip of the plurality of inaudible tone chips.

7. The system of claim 6, wherein the computer is configured to convert the data of the impact into a plurality of data packets and transmit each data packet of the plurality of data packets at a different inaudible frequency.

8. The system of claim 1, wherein at least one housing of the plurality of housings includes a wireless antenna.

9. The system of claim 8, wherein the wireless antenna is configured to transmit or receive data via a WiFi, Bluetooth or cellular network connection.

10. The system of claim 9, wherein the data of the impact is transmitted to a relay, and wherein the relay transmits the data of the impact to the remote device.

11. The system of claim 1, wherein the accelerometers of the plurality of accelerometers are interconnected with each other to form an array of accelerometers.

12. The system of claim 11, further including an integration module connected with the array of accelerometers, wherein the integration module is configured to receive data from each accelerometer of the plurality of accelerometers and generate a data packet including data of the impact for transmission to the remote device.

13. The system of claim 12, wherein the integration module includes at least one processor and at least one memory in communication with the at least one processor.

14. The system of claim 13, wherein the integration module includes at least one wireless antenna configured to communicate with the remote device.

15. The system of claim 14, wherein the integration module further includes a machine learning module configured to analyze the data of the impact.

16. The system of claim 12, wherein the integration module is connected with at least one item of protective equipment worn by the user.

* * * * *